US009127743B2

(12) United States Patent
Tarnawsky

(10) Patent No.: US 9,127,743 B2
(45) Date of Patent: Sep. 8, 2015

(54) CHASSIS BUSHING WITH INTEGRATED TRAVEL LIMITER

(71) Applicant: Zhongli North America Inc., Troy, MI (US)

(72) Inventor: Scott Tarnawsky, Redford, MI (US)

(73) Assignee: Zhongli North America, Inc., Troy, MI (US)

( * ) Notice: Subject to any disclaimer, the term of this patent is extended or adjusted under 35 U.S.C. 154(b) by 0 days.

(21) Appl. No.: 14/246,472

(22) Filed: Apr. 7, 2014

(65) Prior Publication Data

US 2014/0300040 A1 Oct. 9, 2014

Related U.S. Application Data

(60) Provisional application No. 61/808,842, filed on Apr. 5, 2013.

(51) Int. Cl.
*B60G 11/22* (2006.01)
*F16F 1/38* (2006.01)
*B62D 21/11* (2006.01)

(52) U.S. Cl.
CPC .............. *F16F 1/3835* (2013.01); *B60G 11/22* (2013.01); *B62D 21/11* (2013.01)

(58) Field of Classification Search
CPC .... B60G 11/22; B60G 11/23; B60G 2202/14; F16F 1/3835; F16F 1/38
See application file for complete search history.

(56) References Cited

U.S. PATENT DOCUMENTS

| 3,121,560 | A | * | 2/1964 | Reed .............................. 267/258 |
| 3,397,896 | A | * | 8/1968 | Willetts ......................... 280/677 |
| 4,139,246 | A | | 2/1979 | Mikoshiba et al. |
| 4,984,928 | A | | 1/1991 | Domer |
| 6,017,073 | A | * | 1/2000 | Lindblom et al. ........... 296/35.1 |
| 6,378,853 | B1 | | 4/2002 | Kammel et al. |
| 7,789,406 | B2 | | 9/2010 | Matsuoka |
| 8,628,101 | B2 | * | 1/2014 | Koide et al. ............ 280/124.108 |
| 2009/0289399 | A1 | | 11/2009 | Suzuki |

FOREIGN PATENT DOCUMENTS

DE 19612183 A1 * 10/1996
EP 723091 A1 * 7/1996

* cited by examiner

*Primary Examiner* — Anna Momper
(74) *Attorney, Agent, or Firm* — Gifford, Krass, Sprinkle, Anderson & Citkowski, P.C.; Douglas L. Wathen

(57) ABSTRACT

A mold bonded chassis bushing has an outer housing and an inner member separated by a tubular gap. A body of elastomeric material is mold bonded into a first portion of the bushing such that it bridges and at least partially fills the gap. The elastomeric material does not fill or bridge the annular gap in a central area or a second portion of the bushing, such that a void is defined between the inner surface of the outer housing and the outer surface of the inner housing in the central area and second portion. A protrusion extends from the inner surface of the outer housing or the outer surface of the inner member, in the central area such that the void extends between the protrusion and the respective opposed surface. The protrusion functions as a travel limiter for the bushing without compressing the elastomeric material in the first portion.

11 Claims, 4 Drawing Sheets

CHASSIS BUSHING WITH INTEGRATED TRAVEL LIMITER

CROSS REFERENCE TO RELATED APPLICATION

This application claims priority to U.S. provisional application Ser. No. 61/808,842, filed Apr. 5, 2013, the content of which is incorporated herein in its entirety.

BRIEF DESCRIPTION OF THE INVENTION

The present invention relates generally to vibration isolators such as chassis bushings and, more specifically, to a chassis bushing with an integrated travel limiter.

BACKGROUND OF THE INVENTION

Vibration isolators take a variety of forms. One common type is a bushing with a first portion and a second portion interconnected by an elastomeric material. The elastomeric material allows some relative movement between the first and second portions such that vibrations experienced by one portion is at least partially isolated from the other portion. One common type of vibration isolator is referred to as a bushing. A bushing may have an outer sleeve or housing and an inner member disposed inside the outer housing. An elastomeric material at least partially fills a tubular gap between the two. The type and configuration of the elastomeric material varies depending on the application and the desired performance characteristics.

It is often desirable to limit the travel of the inner member relative to the outer housing. For example, when such a bushing is used in a vehicle chassis, it may be desirable to limit the travel of the inner member relative to the outer housing to limit changes in the chassis geometry under high loads. It may also be desirable to limit travel so as to avoid overstressing the elastomeric material. Travel limits may take a variety of forms.

SUMMARY OF THE INVENTION

The present invention provides embodiments of an improved chassis bushing with an integrated travel limit. In a first embodiment, a mold bonded chassis bushing has a generally tubular outer housing with an outer surface and an inner surface each extending between a first end and a second end. A generally cylindrical inner member is disposed inside the outer housing, the inner member having an outer surface spaced from and facing the inner surface of the outer housing. A generally tubular gap is defined between the inner surface of the outer housing and the outer surface of the inner member. The bushing has a first end at the first end of the outer housing and a second end at the second end of the outer housing. The bushing further has a central area intermediate the first and second ends of the bushing, a first portion between the central area and the first end of the bushing and a second portion between the central area and the second end of the bushing. A body of elastomeric material is mold bonded into the first portion of the bushing such that the body of elastomeric material bridges and at least partially fills the tubular gap between the inner surface of the outer housing and the outer surface of the inner housing. The body of elastomeric material does not fill or bridge the tubular gap in the central area and in the second portion of the bushing, such that a void is defined between the inner surface of the outer housing and the outer surface of the inner housing in the central area and second portion of the bushing. At least one protrusion extends from the inner surface of the outer housing or the outer surface of the inner member. The protrusion is disposed in the central area of the bushing such that the void extends between the protrusion and the respective opposed surface. The protrusion functions as a travel limiter for the bushing without compressing the elastomeric material in the first portion of the bushing.

In some versions, the void extends from the central area continuously to the second end of the bushing. In further versions, the at least one protrusion is defined by at least one dent in the outer housing, the at least one dent defining a concave depression in outer surface and a corresponding convex protrusion on inner surface of the outer housing. The at least one dent in the outer housing may be three dents circumferentially disposed around the central area of the outer housing.

In certain versions, the body of elastomeric material further includes a coating of elastomeric material on the inner surface of the outer housing and on the outer surface of the inner member. The void extends between the surface of the coating on the inner member and the surface of the coating on the outer housing.

In certain versions, the inner member has a threaded passage defined therein. In further versions, the first end of the generally tubular outer housing is flanged.

In certain versions, the elastomeric material is rubber. In some versions, the body of elastomeric material mold bonded into the first portion of the bushing bridges the generally tubular gap around the entire circumference of the bushing. The body of elastomeric material mold bonded into the first portion of the bushing may have partially voided areas.

A second embodiment of the present invention, a mold bonded chassis bushing has a generally tubular outer housing with an outer surface and an inner surface each extending between a first end and a second end. A generally cylindrical inner member is disposed inside the outer housing. The inner member has an outer surface spaced from and facing the inner surface of the outer housing. A generally tubular gap is defined between the inner surface of the outer housing and the outer surface of the inner member. The bushing has a first end at the first end of the outer housing and a second end at the second end of the outer housing. A longitudinal axis is defined from the first end to the second end coaxial with the outer housing. The bushing further has a central area intermediate the first and second ends of the bushing, a first portion between the central area and the first end of the bushing and a second portion between the central area and the second end of the bushing. A mold bonded body of elastomeric material mold bridges and at least partially fills the tubular gap between the inner surface of the outer housing and the outer surface of the inner housing in at least part of the bushing. The body of elastomeric material is longitudinally asymmetric with respect to the central area of the bushing. At least one protrusion extends from the inner surface of the outer housing or the outer surface of the inner member. The protrusion is disposed in an area of the bushing where the body of elastomeric material does not fill the tubular gap such that a void is defined between the protrusion and the respective opposed surface. The protrusion functions as a travel limiter for the bushing without compressing the elastomeric material in the first portion of the bushing.

DETAILED DESCRIPTION OF THE INVENTION

Figure 1:
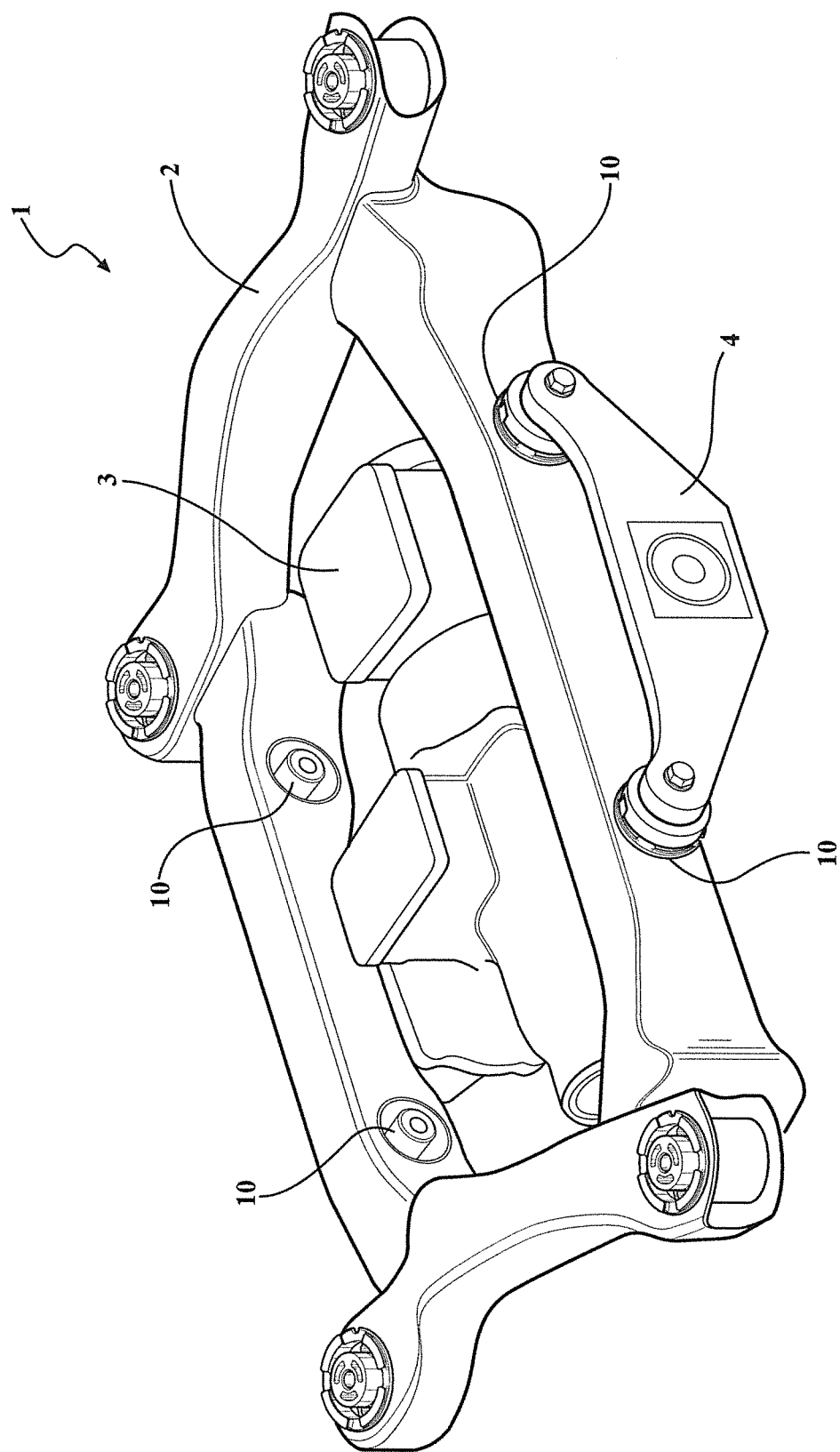
FIG. 1 is a perspective view of an exemplary chassis assembly illustrating a use for bushings in accordance with the present invention.

FIG. 1 illustrates an exemplary chassis assembly 1 for use with a bushing in accordance with the present invention. The chassis assembly includes a subframe or cradle 2, which attaches to a vehicle body. A differential 3 is attached to the cradle 2 using brackets, such as bracket 4. In order to provide some vibration isolation between the differential and cradle, the attachment is made via bushings 10.

Figure 2:
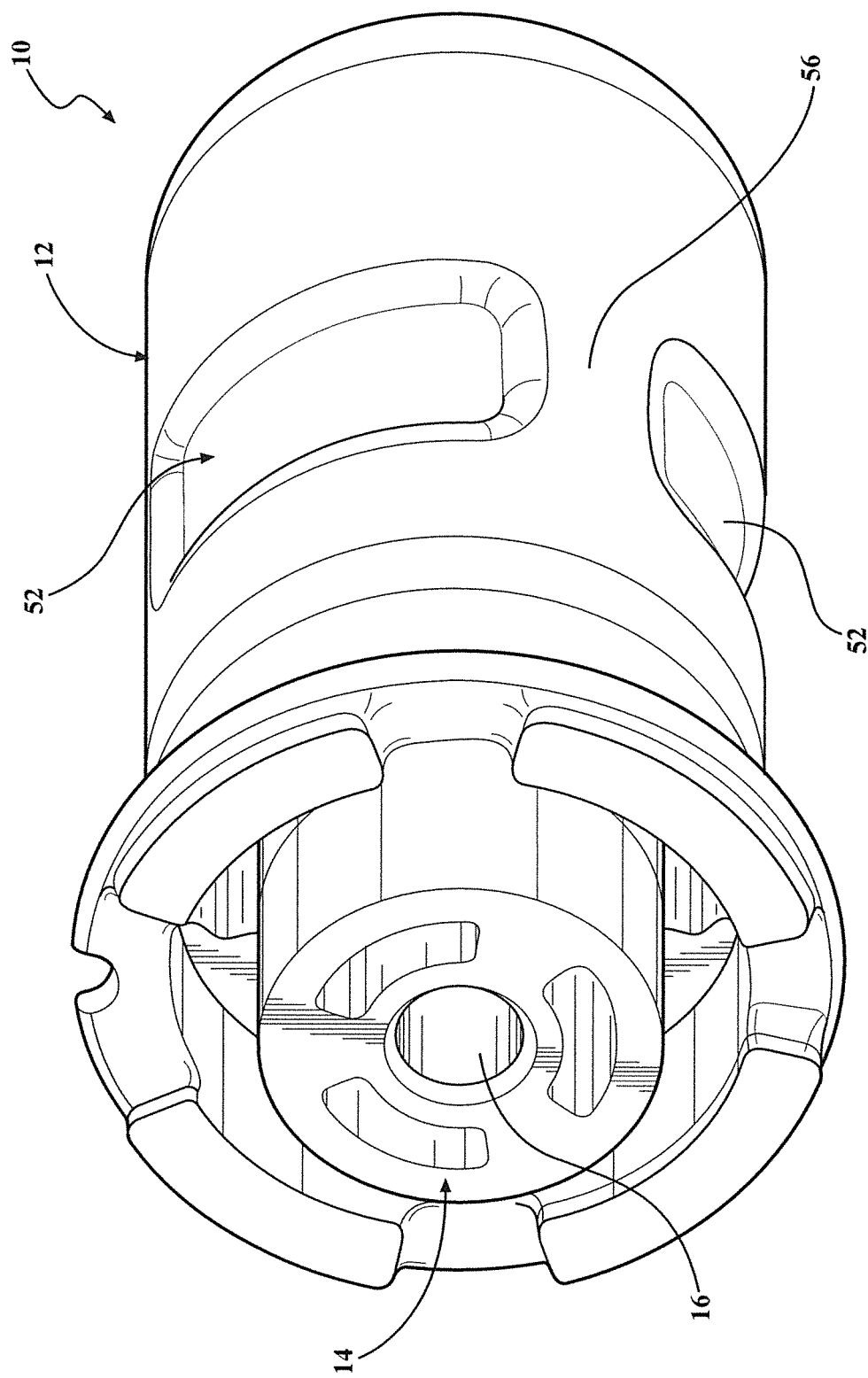
FIG. 2 is a perspective view of a chassis bushing in accordance with an embodiment of the present invention.
Figure 3:
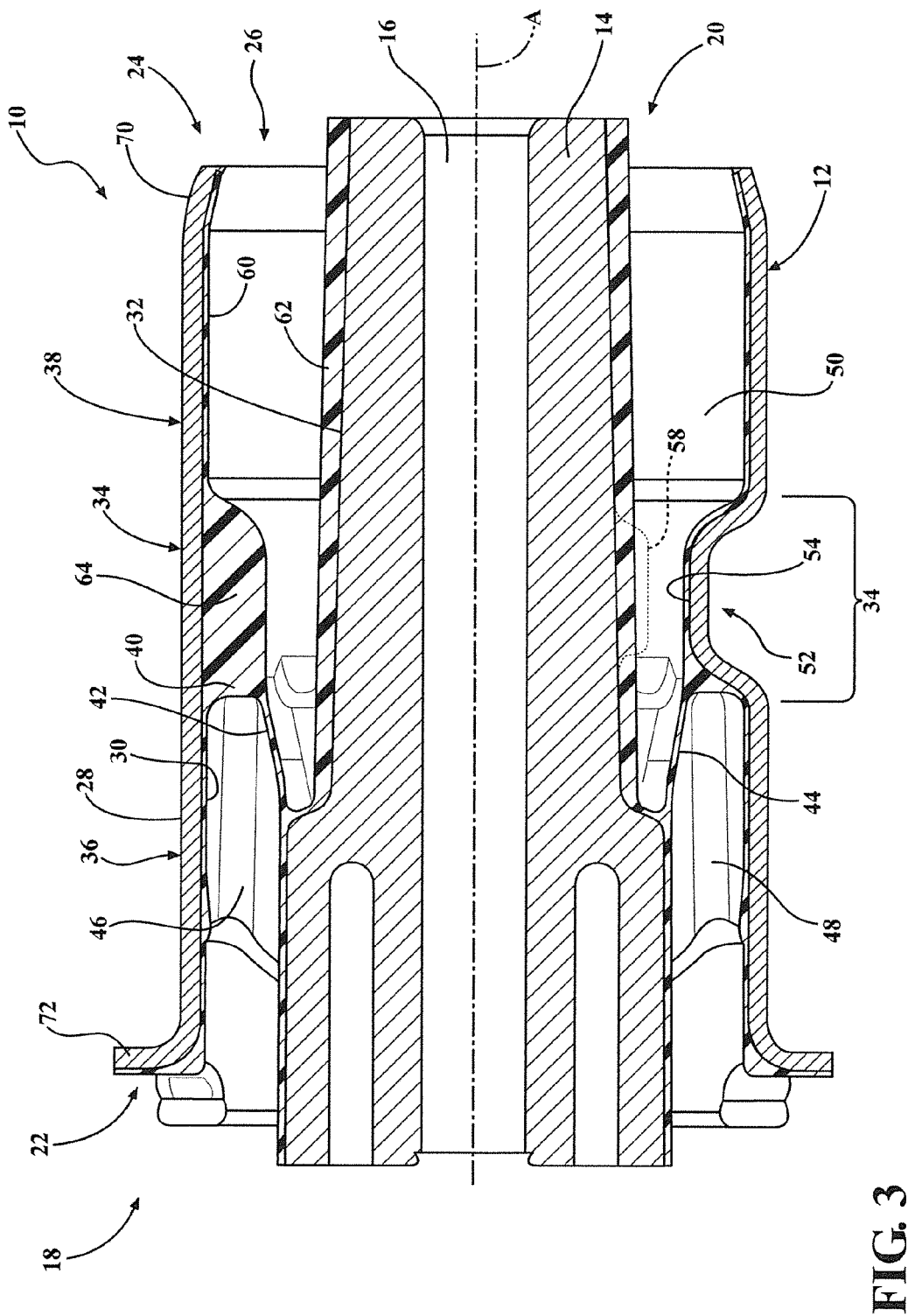
FIG. 3 is a cross sectional view of the chassis bushing of FIG. 2.
Figure 4:
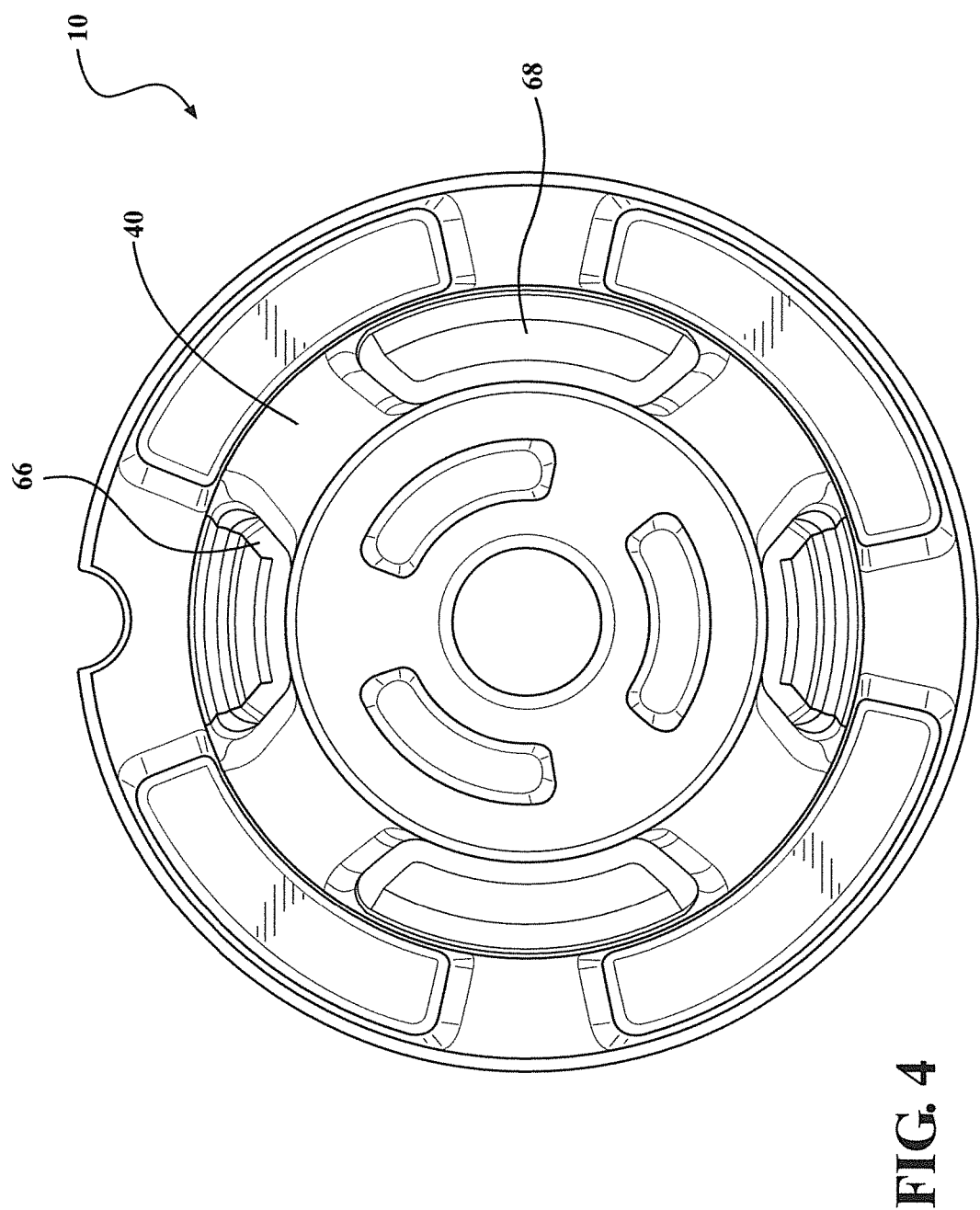
FIG. 4 is an end view of the chassis bushing of FIGS. 2 and 3.

FIGS. 2-4 illustrate a chassis bushing 10 in accordance with the present invention. The bushing 10 has a generally tubular outer sleeve or housing 12 and a generally cylindrical inner member 14 disposed inside of the outer housing 12. Depending on the configuration, the inner member 14 may be a bolt receiver and may have a threaded central passage 16.

The bushing may be said to have a first end 18 and an opposite second end 20. Likewise, the outer housing 12 may be said to have a first end 22 and an opposite second end 24, with the first end 18 of the bushing being at the first end 22 of the outer housing and the second end 20 of the bushing being at the second end 24 of the outer housing 12.

As shown, the inner member 14 may be tapered from one end to the other, though it is still considered to be generally cylindrical for purposes of the present invention. The outer housing 12 and the inner member 14 are coaxial with each other, and with a longitudinal axis A of the bushing 10. The passage 16 may be defined along the longitudinal axis A. As shown, this passage 16 may extend from the first end 18 to the second end 20 of the bushing.

A generally tubular gap 26 may be defined between the inner member 14 and outer housing 12. The outer housing 12 has an outer surface 28 and an opposed inner surface 30. The outer surface 28 of the outer housing defines the outer surface of the bushing. The inner member has an outer surface 32 spaced from and facing the inner surface 30 of the outer housing 12. The generally tubular gap 26 is defined between the outer surface 32 of the inner member 12 and the inner surface 30 of the outer housing 12. The gap 26 may have an irregular shape, as shown, and still be considered generally tubular for purposes of the invention.

The bushing 10 may be said to have a central area 34 that is intermediate the first end 18 and second end 20 of the bushing. A first portion 36 of the bushing is defined between this central area 34 and the first end 18 of the bushing. A second portion 38 of the bushing is defined between the central area 34 and the second end 20 of the bushing.

A body of elastomeric material 40, such as rubber, is disposed in part of the gap 26 and bridges the gap so as to interconnect the inner member 14 with the outer housing 12. In preferred embodiments of the present invention, the body of elastomeric material is longitudinally asymmetric with respect to the central area 34 of the bushing. In the illustrated embodiment, the body of elastomeric material is mold bonded into the first portion 36 of the bushing. The body of elastomeric material at least partially fills the tubular gap in this first portion 36 and bridges between the inner surface 30 of the outer housing 12 and the outer surface 32 of the inner member 14. In FIG. 3, the part of the elastomeric material 40 bridging the gap may be seen at 42 and 44. As will be appreciated by those of skill in the art, the elastomeric material may have a complex shape so as to provide proper chassis tuning. For example, in the illustrated embodiment, a larger area of the body of elastomeric material bridges the gap in the areas marked at 46 and 48. If a cross section of the bushing 10 where illustrated in these areas, additional area would be cross hatched to show that the elastomeric material bridges this part of the gap.

In the illustrated embodiment, the body of elastomeric material 40 bridges the gap 26 only in the first portion 36 of the bushing, and does not bridge the gap in the central area 34 or second portion 38. Instead, a void 50 is defined in the tubular gap 26 in the central area 34 and second portion 38.

In some applications, it is desirable to limit the travel of the inner member 14 relative to the outer housing 12. A travel limit is sometimes provided by placing a ring on the outer surface of the inner member 14 so that the ring extends part way between the inner member 14 and outer housing 12.

In the illustrated embodiment, a travel limit is provided by indentations 52 in the outer housing 12. The indentations are provided in the central area 34 of the bushing and may be considered to define the central area. For example, in FIG. 3, the central area 34 is marked as spanning the area of the indentation 52 and no more. The first portion 36 of the bushing extends from one side of the central area 34 to the first end 18 of the bushing and the second portion 38 extends from the other side of the central area 34 to the second end 20 of the bushing.

The indentations are inwardly extending distortions of the outer housing 12 such that in the area of the indentation 52 an inner surface 54 of the outer housing 12 is positioned closer to the outer surface of the inner member 14 than it would be if the indentation 52 did not exist. For example, in first portion 36 and second portion 38, the inner surface 30 of the outer housing 12 is spaced from the outer surface 32 of the inner member 14 by a distance greater than the distance between the inner surface 54 of the indentation and the outer surface 32 of the inner member 14 in the central area. As shown, the indentation may take the form of a dent in the outer housing 12, defining a concave depression in the outer surface 28 and a corresponding convex protrusion on the inner surface of the outer housing.

In the illustrated embodiment, three partially circumferential indentations are provided in the outer housing 12, equally spaced around the circumference of the housing 12. The indentations 52 are spaced apart from one another by non-indented areas 56 in the outer housing 12. Each indentation 52 is of a similar size and they are equally spaced around the circumference.

In alternative embodiments, more or fewer indentations are provided and/or the indentations have different shapes or configurations. In one example, indentations are only provided in certain areas of the circumference so as to limit travel in some directions, but not in others. The indentations may also be located in different areas along the longitudinal length of the bushing 10. In each case, the indentations may be considered to define the central area of the bushing, with first and second portions defined on opposite sides of the central area. In some embodiments, some indentations may be positioned to one location along the length while other indentations are provided at other positions along the length.

The indentations 52 may more generically be considered to be protrusions extending from the inner surface 30 of the outer housing 12. The protrusions may be formed in other ways, such as by providing a thickened area of the outer housing. However, indentations or dents are a preferred approach. As another alternative, protrusions may be provided extending from the outer surface 32 of the inner member. The configuration of such a protrusion is shown in dotted lines at 58.

As shown in FIG. 3, the void 50 extends into the central area 34 of the bushing such that the void is defined between the inner surface 54 of the indentation or protrusion 52 and the outer surface 30 of the inner member. The void also extends into the second portion 38 of the bushing, and the void may be open to the second end 20 of the bushing. A coating of elastomeric material may be provided on the inner surface 30 of the outer housing 12 and on the outer surface 32 of the inner member 14 in the central area 34 and second portion 38, as shown at 60 and 62. In this case, the void 50 extends between the surfaces of the coating 60 and 62. As also shown in FIG. 3, this coating may be thicker in the area at 64, which corresponds to the area 56 (see FIG. 2) between the indentations 52. Because of the void between the indentation 52 and the inner member 14, the indentation 52 does not impact the performance of the bushing until the inner member has reached a travel limit defined by the indentation 52. The inner member movement and the bushing rate are controlled only by the body of elastomeric material in the first portion 36 of the bushing until the inner member 14 moves far enough that the void is eliminated and the indentation 52 contacts the inner member 14, or the elastomeric coatings 60 and 62 contact.

The bushing 10 is a mold bonded bushing, meaning the inner member 14 is positioned inside the outer housing 12 and the elastomeric material is then molded into the tubular gap 26, forming the bushing. The protrusions or indentations may be formed prior to the mold bonding. As such, the indentation 52 does not compress the elastomeric material. Alternatively, the indentations 52 may be formed after mold bonding. Due to the presence of the void, the formation of the indentations would not alter the rate of the bushing.

Referring now to FIG. 4, an end view of the first end 18 of the bushing 10 is shown. In this embodiment, the body of elastomeric material has partially voided areas, as marked at 66 and 68. These voids are used to tune the bushing. Despite these voided areas, the elastomeric material in the illustrated embodiment bridges the gap around the entire circumferences of the bushing. In alternative embodiments, this may not be the case.

As best shown in FIG. 3, the outer housing 12 may be tapered at the second end 24 as shown at 70 and may be flanged at the first end 22 as shown at 72. The tapered end 70 allows for assembly of the bushing into the cradle 2 and the flange 72 acts to limit how far the bushing is inserted into the cradle.

As will be clear to those of skill in the art, the herein described embodiments of the present invention may be altered in various ways without departing from the scope or teaching of the present invention. It is the following claims, including all equivalents, which define the scope of the present invention.

The invention claimed is:

1. A mold bonded chassis bushing, comprising
a generally tubular outer housing having an outer surface and an inner surface each extending between a first end and a second end;
a generally cylindrical inner member disposed inside the outer housing, the inner member having an outer surface spaced from and facing the inner surface of the outer housing, a generally tubular gap being defined between the inner surface of the outer housing and the outer surface of the inner member;
the bushing having a first end at the first end of the outer housing and a second end at the second end of the outer housing, the bushing further having a central area intermediate the first and second ends of the bushing, the bushing having a first portion between the central area and the first end of the bushing and a second portion between the central area and the second end of the bushing;
a body of elastomeric material mold bonded into the first portion of the bushing such that the body of elastomeric material bridges and at least partially fills the tubular gap between the inner surface of the outer housing and the outer surface of the inner housing;
the body of elastomeric material not filling or bridging the tubular gap in the central area and in the second portion of the bushing, such that a void is defined between the inner surface of the outer housing and the outer surface of the inner housing in the central area and second portion of the bushing; and
at least one protrusion extending from the inner surface of the outer housing or the outer surface of the inner member, the at least one protrusion disposed in the central area of the bushing such that the void extends between the at least one protrusion and a respective opposed surface;
whereby the at least one protrusion functions as a travel limiter for the bushing without compressing the elastomeric material in the first portion of the bushing.

2. A mold bonded chassis bushing in accordance with claim 1, wherein the void extends from the central area continuously to the second end of the bushing.

3. A mold bonded chassis bushing in accordance with claim 1, wherein the at least one protrusion is defined by at least one dent in the outer housing, the at least one dent defining a concave depression in outer surface and a corresponding convex protrusion on inner surface of the outer housing.

4. A mold bonded chassis bushing in accordance with claim 3, wherein the at least one dent in the outer housing is three dents circumferentially disposed around the central area of the outer housing.

5. A mold bonded chassis bushing in accordance with claim 1, wherein the body of elastomeric material further includes a coating of elastomeric material on the inner surface of the outer housing and on the outer surface of the inner member, the coating having a surface, the void extending between the surface of the coating on the inner member and the surface of the coating on the outer housing.

6. A mold bonded chassis bushing in accordance with claim 1, wherein the inner member has a threaded passage defined therein.

7. A mold bonded chassis bushing in accordance with claim 1, wherein the first end of the generally tubular outer housing is flanged.

8. A mold bonded chassis bushing in accordance with claim 1, wherein the elastomeric material is rubber.

9. A mold bonded chassis bushing in accordance with claim 1, wherein the body of elastomeric material mold bonded into the first portion of the bushing bridges the generally tubular gap around the entire circumference of the bushing.

10. A mold bonded chassis bushing in accordance with claim 9, wherein the body of elastomeric material mold bonded into the first portion of the bushing has partially voided areas.

11. A mold bonded chassis bushing, comprising:

a generally tubular outer housing having an outer surface and an inner surface each extending between a first end and a second end;

a generally cylindrical inner member disposed inside the outer housing, the inner member having an outer surface spaced from and facing the inner surface of the outer housing, a generally tubular gap being defined between the inner surface of the outer housing and the outer surface of the inner member;

the bushing having a first end at the first end of the outer housing and a second end at the second end of the outer housing, a longitudinal axis being defined from the first end to the second end coaxial with the outer housing, the bushing further having a central area intermediate the first and second ends of the bushing, the bushing having a first portion between the central area and the first end of the bushing and a second portion between the central area and the second end of the bushing;

a mold bonded body of elastomeric material mold bridging and at least partially filling the tubular gap between the inner surface of the outer housing and the outer surface of the inner housing in at least part of the bushing, the body of elastomeric material being longitudinally asymmetric with respect to the central area of the bushing; and at least one protrusion extending from the inner surface of the outer housing or the outer surface of the inner member, the at least one protrusion disposed in an area of the bushing where the body of elastomeric material does not fill the tubular gap such that a void is defined between the at least one protrusion and a respective opposed surface;

whereby the at least one protrusion functions as a travel limiter for the bushing without compressing the elastomeric material in the first portion of the bushing.

* * * * *